Dec. 1, 1959
C. L. FARRAND ET AL
2,915,721
REDUCTION OF SINGLE-TURN LOOP COUPLING
IN POSITION-MEASURING TRANSFORMERS
Filed June 13, 1957
4 Sheets-Sheet 1
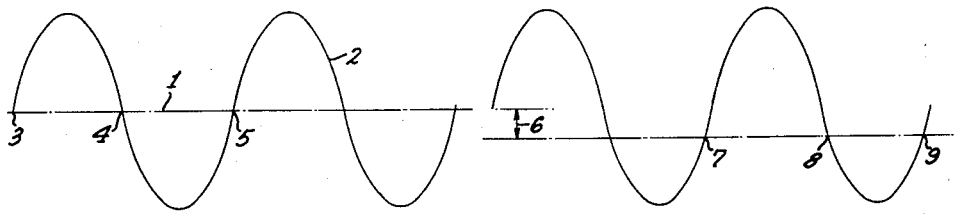
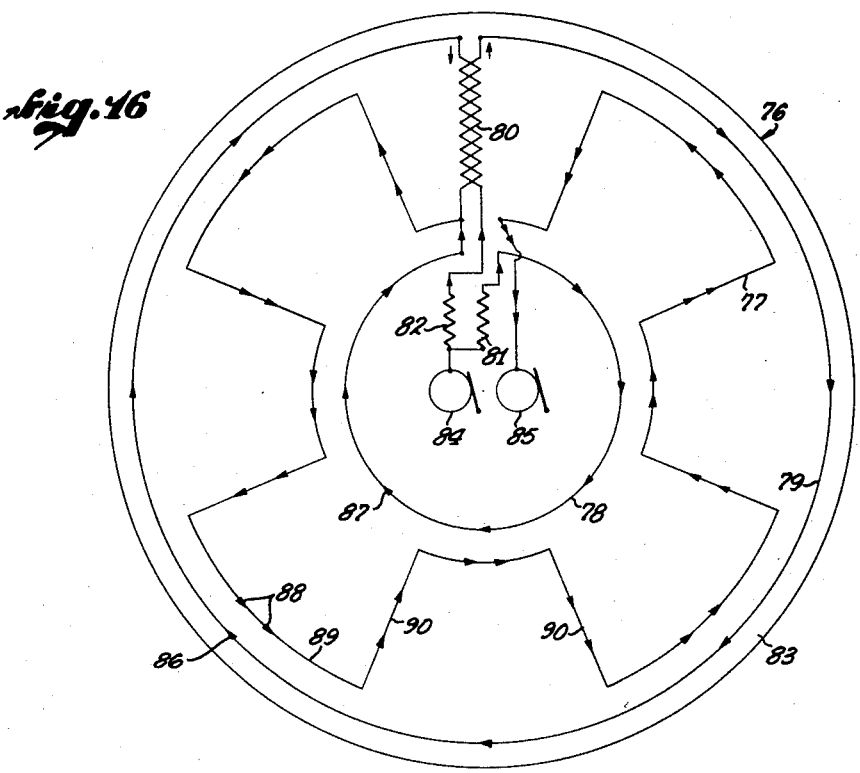
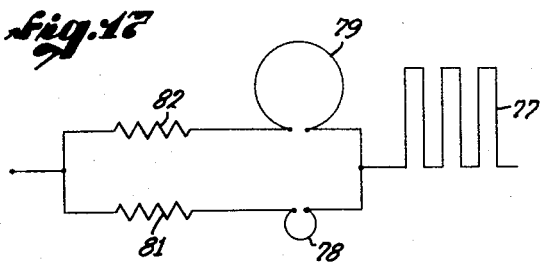
CLAIR L. FARRAND &
JAMES L. WINGET,
INVENTORS.
BY W. E. Beatty
ATTORNEY.

Dec. 1, 1959 C. L. FARRAND ET AL 2,915,721
REDUCTION OF SINGLE-TURN LOOP COUPLING
IN POSITION-MEASURING TRANSFORMERS
Filed June 13, 1957 4 Sheets-Sheet 2
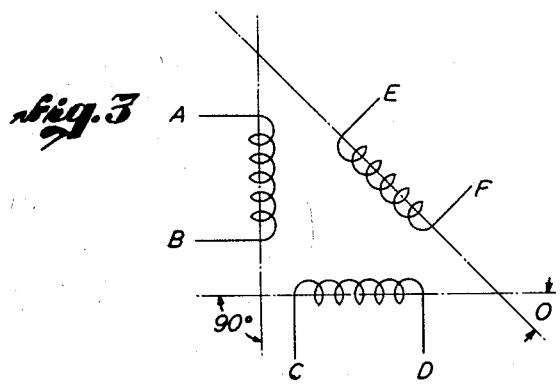
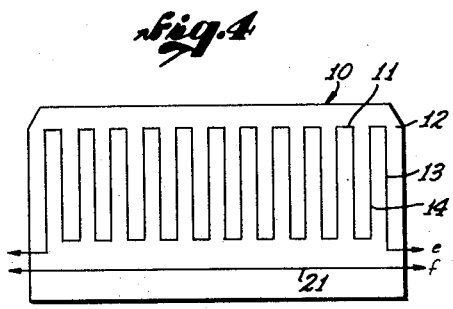
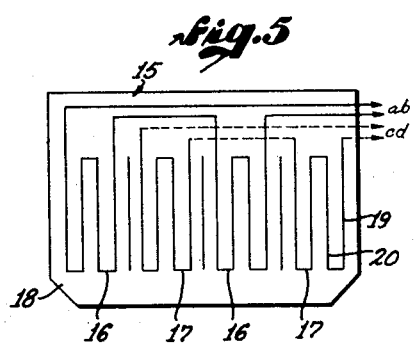
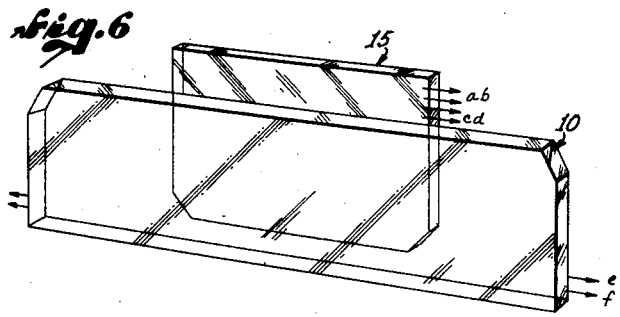
CLAIR L. FARRAND &
JAMES L. WINGET,
INVENTORS.
BY *W E Beatty*
ATTORNEY.

Dec. 1, 1959  C. L. FARRAND ET AL  2,915,721
REDUCTION OF SINGLE-TURN LOOP COUPLING
IN POSITION-MEASURING TRANSFORMERS
Filed June 13, 1957  4 Sheets-Sheet 3
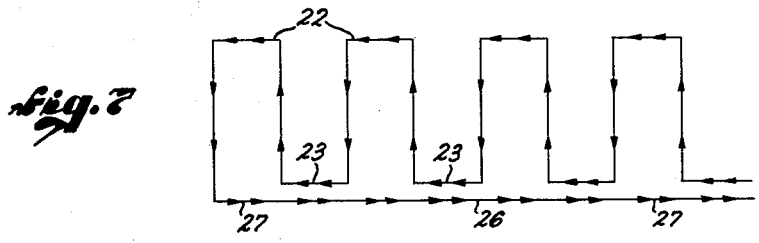
*fig.7*
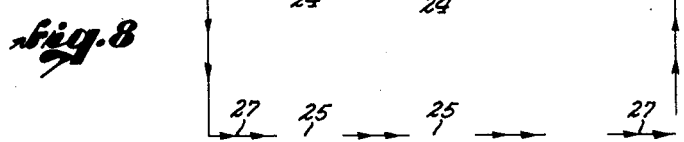
*fig.8*
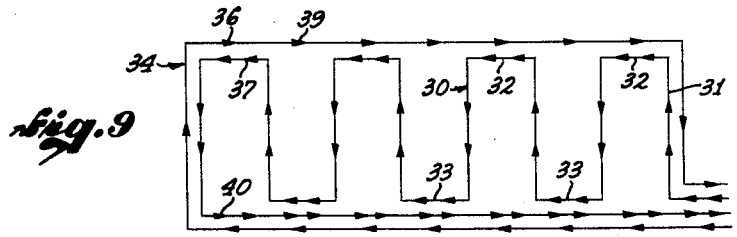
*fig.9*
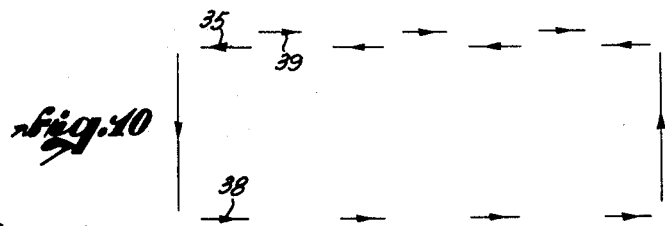
*fig.10*
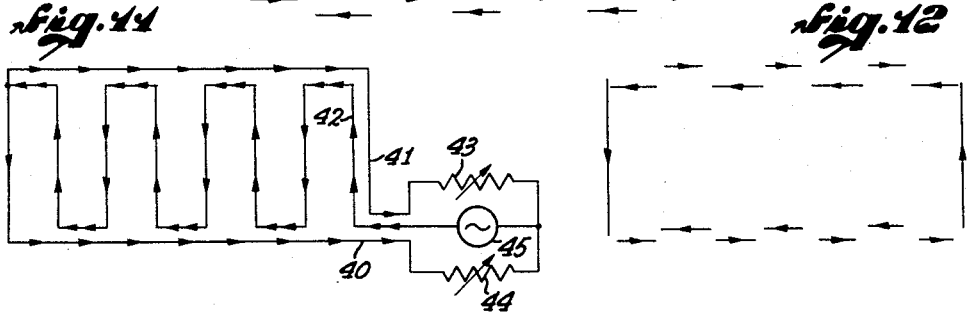
*fig.11*  *fig.12*
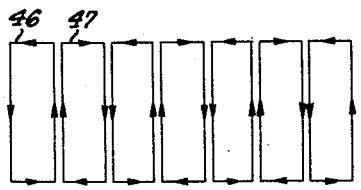
*fig.13*
CLAIR L. FARRAND &
JAMES L. WINGET,
    INVENTORS.
BY  *W E Beatty*
ATTORNEY.

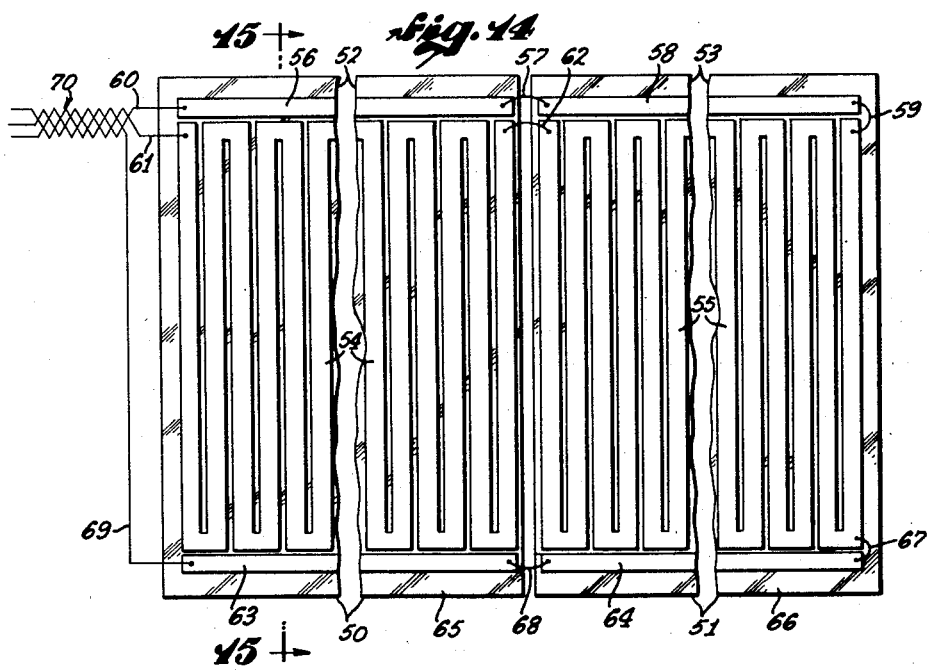
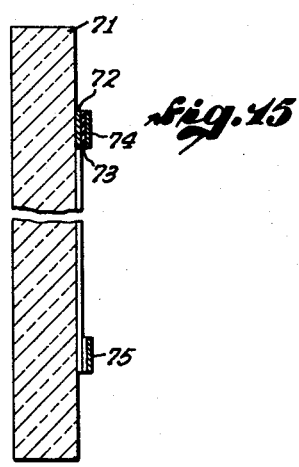
CLAIR L. FARRAND &
JAMES L. WINGET,
INVENTORS.

United States Patent Office 2,915,721
Patented Dec. 1, 1959

2,915,721

REDUCTION OF SINGLE-TURN LOOP COUPLING IN POSITION-MEASURING TRANSFORMERS

Clair L. Farrand, Bronxville, and James L. Winget, Harrison, N.Y., assignors to Inductosyn Corporation, Carson City, Nev., a corporation of Nevada Application June 13, 1957, Serial No. 665,457

5 Claims. (Cl. 336—69)

Position-measuring transformers are used in both rotary form and linear form to establish positions of rotary shafts and linear slides to an accuracy of a few hundred thousandths of an inch.

One preferred form, known as the Inductosyn,[1] utilizes the magnetic field produced by a series of hairpin-like conductors, arranged in alternate north and south poles. In such a case, the primary consists of two windings spaced one-quarter cycle with respect to each other, and the secondary is a single winding. These windings are of the form described in co-pending application, Serial No. 509,168, filed May 18, 1955, by R. W. Tripp and J. L. Winget, now Patent 2,799,835 where the conductors have been arranged and proportioned to achieve a uniformity of magnetic coupling between primary and secondary windings, which is truly sinusoidal with respect to displacement. Position-measuring transformers of these types have been made wherein a cycle, that is 2 poles, occupies a space of .100 inch and the coupling corresponds to a sine within one part in one thousand. By supplying precise sine and cosine potentials, respectively, to the two primary windings, an accuracy of position has been achieved of 1 milliradian (approximately one six-thousandths of a cycle or 16 millionths of an inch). This highly accurate wave form of magnetic coupling does not permit of any deleterious additional couplings between primary and secondary circuits of this order of magnitude.

It is well known that magnetic coupling exists between the leads of the primary and secondary windings of transformers, in addition to the coupling between the coils themselves.

In position-measuring transformers of this nature, it is desirable to use an alternating current of a high frequency such as 10 kc. to provide sufficient coupling between primary and secondary windings. The higher the frequency used, the greater the electromagnetic coupling between windings and leads.

The object of the present invention is to eliminate or reduce such minute extraneous electromagnetic couplings, to a point where they are negligible in comparison with the extremely small increment of magnetic coupling required to establish accurate positioning of the magnitudes referred to above.

For further details of the invention, reference may be made to the drawings wherein, Fig. 1 is a curve showing the correct and equal spacing of the nulls for a sinusoidal coupling wave between the transformer members, assuming no single-turn loop coupling.

Fig. 2 is a similar curve showing the displacement of the nulls due to single-turn loop coupling, the spacing of the nulls being equal in Fig. 1 and alternately long and short in Fig. 2.

Figs. 3 to 6 pertain to a linear type of position-measuring transformer, Fig. 3 schematically illustrating the arrangement of the winding, Fig. 4 being a plan view

[1] Registered trademark.

of the stationary continuous winding member or scale, Fig. 5 being a plan view of the cooperating quadrature member or slider and Fig. 6 being a perspective view showing the close space and inductive arrangement of the members of Figs. 4 and 5.

Fig. 7 schematically shows the direction of current in the conductors of the stationary winding of Fig. 4 and Fig. 8 schematically illustrates the equivalent of the current flow in Fig. 7 which creates the large one-turn loop coupling.

Fig. 9 schematically illustrates the current flow where an additional loop is provided according to the present invention, and Fig. 10 is a corresponding schematic showing illustrating the equivalent of Fig. 9 and the cancellation of the large one-turn loop coupling by the use of the additional loop of Fig. 9.

Fig. 11 illustrates a modified form of the invention wherein two return conductors are provided for the continuous winding of Fig. 4, the equivalent current flow being shown in the schematic showing of Fig. 12.

Fig. 13 schematically illustrates the equivalent of the arrangement of Figs. 9 and 11.

Fig. 14 is a plan view of a plurality of continuous winding members connected in series and each having an additional return conductor in accordance with the invention, such scale members being provided in sufficient quantity for the distance to be measured or controlled by the slider member of Fig. 5.

Fig. 15 is a sectional view on line 15—15 of Fig. 14.

Fig. 16 is a schematic plan view of a rotary form of position-measuring transformer, the rotor being shown and having a continuous winding analogous to the member in Fig. 4, the stator or quadrature winding member corresponding to the member in Fig. 5 not being shown in Fig. 16.

Fig. 17 is a schematic showing of the circuit of Fig. 16.

Referring in detail to the drawings, if an unwanted fixed coupling is added to the sinusoidal coupling between the transformer members, the spacing between points of zero coupling or nulls, which should be equal, are made alternately shorter and longer. This is illustrated in Figs. 1 and 2. For example, as shown in Fig. 1, the horizontal axis 1 represents the position of the movable member and the vertical axis represents the amplitude of coupling between the windings of the movable transformer member and the windings of the fixed transformer member. The coupling wave of sinusoidal form is indicated at 2 and the intersections with the zero axis, or nulls, like 3—4, 4—5 are equally spaced. If a fixed coupling from a single-turn loop is added as shown at 6 in Fig. 2, the position of the wave is altered with respect to zero, and the spacing of the nulls like 7—8, 8—9 is alternately long and short.

Figs. 3 to 6 show a form of Inductosyn position-measuring transformer of the linear type, where Fig. 3 is the schematic arrangement of the winding. As shown in Fig. 3, one of the transformer members illustrated in Figs. 3 to 6, has the space quadrature windings A, B and C, D, the other transformer member having a single winding represented at E, F. Either transformer member may be stationary and the other movable. In the case of the linear form, as shown in Fig. 5, the slider or movable member is illustrated as the quadrature winding member while in the case of the rotary form illustrated in Fig. 16, the single winding member is illustrated as being rotatable, the quadrature winding member not shown being stationary. If currents in the relation of sine and cosine are supplied to the quadrature windings of Fig. 3, there will be a particular position of the single winding E, F where the current induced therein from the quadrature windings is zero, other positions producing an error current which can be measured or employed to drive the machine tool or other driven element to a desired position determined by the actual values of the co-function current supplied to the quadrature windings, corresponding to a null value of the error current.

In Figs. 4, 5 and 6, the two members 10 and 15 of the linear form are shown, the stationary member 10 or scale as shown in Fig. 4 having only one winding 11 in the form of an electro-deposit on a glass plate 12. In practice, this winding 11 may be 10 inches in length and have 200 conductors, each 1½ inches long as illustrated by the parallel conductors 13 and 14 which extend at right angles to the direction of relative movement of members 10 and 15. In Fig. 5, the movable member 15 or slider is also shown having two windings 16 and 17 in the form of an electro-deposit on a glass plate 18. Windings 16 and 17 are spaced one-quarter cycle. In practice, these windings 16 and 17 may each have 32 position-measuring conductors, occupying 3.6 inches of the member. For convenience of illustration, each of the windings 16 and 17 is shown as having only eight position-measuring conductors like conductors 19 and 20. Fig. 6 shows the arrangement of the members 10 and 15 with their conductor portions facing each other and separated by a small air gap.

The parallel conductors like 13 and 14 of the winding 10 carry current in alternate directions, forming alternate north and south poles. These conductors like 13 and 14 of the winding 10 are, of course, inductively related to the conductors of windings 16 and 17 and cooperate therewith to measure position. However, the conductors like 13 and 14 of the winding 10 form one side of a single loop, the other side of this loop being the return conductor 21. This single-turn loop results in an unwanted coupling with the quadrature windings 16 and 17 of the slider 15, the effect of this single-turn loop coupling being indicated at 6 in Fig. 2 and resulting in an error in the null positons as explained in connection with Fig. 2.

Fig. 7 shows the direction of current in the conductors of the stationary winding 11 of Fig. 4, and Fig. 8 shows the portion of the current flow which creates the large one-turn loop coupling. The instantaneous current amplitudes have been indicated for convenience by a double arrow as having two units of amplitude. It will be noted that the current flows for a number of short distances like 22 aggregating one-half the length of the upper portion of the loop and for a number of short distances like 23 aggregating one-half the length of the lower portion of the loop.

In Fig. 8, the blank spaces like 24 at the top of the loop correspond to the absence of a conductor portion between adjacent conductor portions like 22, while the blank spaces like 25 at the bottom of the loop correspond to the opposite current flow between the short lengths like 23 in Fig. 7 and the adjacent portion of the return conductor as indicated at 26. The current flow in the short portions like 22 in Fig. 7 are shown in Fig. 8 by the same reference number 22, while the current flow in the return conductor for which there is no effective cancellation by a closely spaced current flow like 23, is indicated by the reference number 27 in both Figs. 7 and 8.

It may be considered that the strength of the magnetic field is proportional to the product of conductor length and current amplitude. By the present invention, current is caused to flow in opposition at one-half of the amplitude of the working current for the entire length of both upper and lower portion of the loop. This gives a field strength corresponding to the product of twice the length and one-half current amplitude in the upper and lower portion of the loop, substantially reducing or cancelling the effect of the large single-turn loop coupling while retaining the magnetic coupling of the position-measuring conductors.

This will be seen from Fig. 9, where 31 indicates the transverse parallel positon-measuring conductors, 32 the upper portions of the single turn loop 30 having the lower portions 33. The additional single-turn loop 34 is provided according to the present invention. Loop 34 carries current of one-half the amplitude in opposition to the current in the upper and lower portions 32 and 33 of the windings and is closely coupled to them. This results in an equivalent array of conductors as shown in Fig. 10, where it is seen that the resultant or equivalent current flow is in one direction for a short distance, i.e., the pitch of the straight conductors, and alternately in the opposite direction for a similar short distance, so that the effect of the large one-turn loop is cancelled. For example the current flow portion indicated at 35 in Fig. 10, indicated as one unit of instantaneous amplitude flowing to the left, is the resultant of one amplitude indicated in Fig. 9 at 36 flowing to the right in the loop 34 and two units indicated at 37 flowing to the left in one of the upper conductor portions like 32. Similarly, the unit amplitude current flow to the right indicated at 38 in Fig. 10 is the resultant of unit amplitude to the left in loop 34 as indicated at 39 in Fig. 9 and two units as indicated at 40 flowing to the right in the return conductor for the conductor portions like 31, 32 and 33. A current flow portion like 39 in Fig. 10 corresponds to the unit amplitude current flow indicated by the same reference number 39 in Fig. 9, not being cancelled due to absence of an adjacent conductor portion like 32 or 37.

In Fig. 11 is shown a method equivalent to that of Figs. 9 and 10 and in some ways more convenient. Instead of having one return conductor as shown at 21 in Fig. 4, two return conductors 40 and 41 are provided and the current flowing through the position-measuring conductors 42 is divided equally between the two return conductors 40 and 41 by adjusting the resistance of paths 40 and 41 to equality by means of variable resistors 43 and 44 which are preferably of low value. The device indicated at 45 is typical of a synchro switch-controlled servo motor or other translating device receiving the error current of the single winding transformer member, or other indicator or source.

Fig. 12 shows the current flow equivalent of that in Fig. 11, with substantial reduction or elimination of the one-turn loop coupling.

The equivalent of the arrangements of Figs. 9 and 11 is shown in Fig. 13, where such position-measuring conductor is considered to be two conductors occupying the same space and each carrying one-half the current. It is seen that the result is the equivalent of a series of position-measuring loops only like loops 46 and 47, without the presence of a large single-turn loop, as is the case in Fig. 7.

Fig. 14 shows the arrangement of the return conductors in accordance with the invention as applied to a series array of position-measuring transformers, the stationary or scale members of typical ones being represented at 50 and 51, and the broken lines 52 and 53 indicating the intermediate portion of each scale member. Other scale members may be used in sufficient quantity to extend the desired distance to be controlled or measured. The array of position-measuring conductors on the scale member 50 are indicated by the reference number 54 and on the adjoining scale member 51 by the reference number 55. The single return conductor 56 on the scale member 50 is connected in series by jumper 57 with the corresponding return conductor 58 on the scale member 51 and conductor 58 is connected by jumper 59 to one end of the winding 55, the terminal conductors for the windings 54 and 55 and the return conductor 56 being shown at 60 and 61, the adjacent ends of the windings 54 and 55 also being connected together as shown at 62. The single return conductor 56 and 58 correspond to the conductor 21 in Fig. 4 and have the disadvantage of resulting in a single-turn loop coupling as previously described. In accordance with the invention, the additional return conductors are added along the opposite end of the conductor arrays 54 and 55, the conductor arrays 54 and 55 and return conductors 56, 58, 63 and 64 comprising an electro-deposit on their respective glass plates 65 and 66, as previously described. The return conductor 64 is connected to the adjacent end of the conductor array 55 by the jumper 67 and the adjacent ends of the return conductors 63 and 64 are connected by a jumper 68, the return conductor 63 having the terminal conductor 69.

Referring to Fig. 14, the loop which effectively cancels the one-turn loop coupling otherwise present is obtained by connecting the return conductors 56, 58, 63 and 64 and the arrays 54 and 55 to a 3-conductor twisted cable 70 made up of the terminal conductors 60, 61 and 69.

The return conductors 56, 58, 63 and 64 may be positioned as above described on the surface of their respective supporting glass plates 65 and 66 adjacent to the ends of the conductor arrays 54 and 55 as shown in Fig. 14 or alternatively, these return conductors may be placed over the ends of the conductor array separated therefrom by a thin layer of insulating material as shown in Fig. 15 where the glass support is indicated at 71, and a conductor array like 54 is indicated at 72, the insulation being represented at 73 for a return conductor 74 which corresponds to 56 or 58 in Fig. 14, the lower return conductor corresponding to 63 or 64 being shown at 75, no insulating material being shown at that point due to the location of the section line 15—15, but insulating material like 73 being employed between the return conductor 75 and the adjacent ends of the conductor array like 72.

Fig. 16 illustrates the application of the invention to a position-measuring transformer of the rotary form. While the invention is applicable to either the rotor or stator, only the rotor indicated at 76 is shown in Fig. 16, being provided with a single winding 77 and having slip rings and brushes 84 and 85 for connection to a source or servo circuit or other translating device. The return conductors provided according to the present invention are arranged circumferentially, one of them indicated at 78 being radially inside of winding 77, the other return conductor indicated at 79 being radially outside of winding 77. The two return conductors 78 and 79 are connected through a twisted pair indicated at 80 to form a return circuit as indicated schematically at Fig. 17. As the inner and outer return conductors 78 and 79 are of different lengths, resistors 81 and 82 are inserted in series with them and they are of such values as to provide the same current in each of the return conductors 78 and 79.

The conductors 78 and 79 are arranged to carry current in a direction opposite to the direction of current in winding 77 as shown by the arrows and by connection through the twisted pair 80. The winding 77 and the return conductors 78 and 79, as previously described in connection with the linear form, comprise an electro-deposit on the same side of a glass disk indicated at 83. The twisted pair 80 may be conveniently placed on the opposite surface of the support 83.

In Fig. 16, as in the other figures such as Fig. 11, a single arrow represents a current strength of one-half the amplitude of the current represented by two arrows. For reasons explained above, it will be apparent that the arrangement in Fig. 16 reduces or substantially eliminates the one-turn loop coupling otherwise due to a single return conductor. For example, the current of unity amplitude flowing to the left in conductor portion 86 of the return conductor 79 and the unity amplitude current in portion 87 of the return conductor 78, also flowing to the left, are opposed and substantially counterbalanced by the current of double strength as indicated by the two arrows 88 in the end turn portion 89 of the winding 77. The radial conductor portions like 90 of the winding 77 are the position-measuring active conductor portions and they extend at right angles to the direction of relative movement of the transformer member 76 and the cooperating transformer member not shown but which is provided with two windings in space quadrature, its active conductor portions likewise extending radially.

Various modifications may be made in the invention without departing from the spirit of the following claims.

We claim:

1. In single-turn loop coupling reduction, the combination of a position-measuring transformer member having a winding, said winding comprising a longitudinally extending array of transverse active conductor portions, and two return conductors dividing the current path for said winding, said return conductors extending lengthwise of said array adjacent the opposite ends respectively of said active conductor portions.

2. Means for reducing the single-turn loop coupling between relatively movable inductively related position-measuring transformer members, one of said transformer members comprising a single winding and the other transformer member comprising two windings in space quadrature of the pole cycle of said single winding, the conductors of each of said windings constituting alternate north and south poles, a pole cycle being a small fraction of an inch, said single winding having a return conductor at one side thereof forming therewith a single-turn loop coupling with the quadrature windings of said other transformer member, in combination with an additional return conductor at the other side of said single winding, said return conductors substantially equally dividing the current of said single winding.

3. Means for reducing the single-turn loop coupling according to claim 2, said single winding and said return conductors being in the form of electro-deposits on an insulating support.

4. Means for reducing the single-turn loop coupling according to claim 3, the windings of each of said position-measuring transformer members comprising a linear array.

5. Means for reducing the single-turn loop coupling according to claim 3, said transformer members being relatively rotatable, one of said return conductors being radially outward and the other return conductor being radially inward of said single winding, and impedance means in circuit with each of said return conductors for adjusting said current division.

References Cited in the file of this patent

UNITED STATES PATENTS

| | | |
|---|---|---|
| 2,685,070 | Childs | July 27, 1954 |
| 2,799,835 | Tripp | July 16, 1957 |